Patented Oct. 16, 1951

2,571,371

UNITED STATES PATENT OFFICE 2,571,371

PREPARATION OF 2,2'-DITHIENYL SULFIDE

Emil Koft, Jr., Woodbury Heights, N. J., assignor to Socony-Vacuum Oil Company, Incorporated, a corporation of New York No Drawing. Application March 23, 1950, Serial No. 151,536

6 Claims. (Cl. 260—329)

This invention relates to an improved process for preparing 2,2'-dithienyl sulfide.

This compound has previously been produced by the reaction of 2-thienyl magnesium bromide with sulfur or sulfur monochloride. It has thus heretofore been necessary in preparing 2,2'-dithienyl sulfide to first produce a suitable Grignard reagent. The synthesis of this intermediate is both time-consuming and expensive, rendering methods employing the same distinctly unattractive from a commercial standpoint.

It is accordingly an object of the present invention to prepare 2,2'-dithienyl sulfide without the intermediate preparation of a Grignard reagent. It is a further object of this invention to produce 2,2'-dithienyl sulfide in an effective manner from readily available reagents. A still further object is the provision of a practical process for preparing 2,2'-dithienyl sulfide which lends itself to commercial production.

These and other objects, which will be apparent to those skilled in the art, are achieved by the process of this invention. Broadly stated, the method described herein contemplates the production of 2,2'-dithienyl sulfide by thermal decomposition of 2,2'-dithienyl disulfide at a temperature within the range of about 140° C. to about 300° C.

Pressure conditions during the aforementioned thermal decomposition may vary over a wide range extending from 0.1 millimeter of mercury up to pressures approximating normal atmospheric conditions (760 millimeters of mercury). Preferably, the desired thermal decomposition is effected by vacuum distillation of 2,2'-dithienyl disulfide carried on in the above-mentioned temperature range, yielding 2,2'-dithienyl sulfide along with hydrogen sulfide and a coke-like residue. Distillation of 2,2'-dithienyl disulfide is, in accordance with the present invention, ordinarily accomplished at a reduced pressure of less than about 100 millimeters of mercury. Generally the thermal decomposition contemplated by the present process is effected by vacuum distillation of 2,2'-dithienyl disulfide at a temperature between about 140° C. and about 200° C. at a pressure between about 0.1 and about 10 millimeters of mercury.

The reactant of 2,2'-dithienyl disulfide used in the present process may be obtained in any convenient manner. However, for practical purposes, it is preferred to prepare this material directly from thiophene in accordance with the procedure described in detail in application Serial No. 151,535, filed March 23, 1950. Briefly, this process involves the addition of sulfur monochloride to thiophene maintained in excess during the course of reaction and present in such amount that the overall molar ratio of thiophene to sulfur monochloride is greater than 2. Preferably, the molar ratio of thiophene to sulfur monochloride is greater than about 5 but will generally not exceed about 20. The temperature at which the foregoing reaction is carried out is ordinarily within the range of about 20° C. to about 135° C., although it will be understood that temperatures outside of this range may, with the use of pressure or other modified conditions, be employed. Ordinarily, however, the reaction will take place under ordinary pressure conditions and at a reflux temperature within the range of about 75° C. to about 85° C.

A particularly convenient method for obtaining 2,2'-dithienyl sulfide is by vacuum distillation of 2,2'-dithienyl disulfide directly from the vessel in which the dithienyl disulfide has been prepared. Thus, after reacting excess thiophene and sulfur monochloride as above described to give a reaction mixture of 2,2'-dithienyl disulfide, this reaction mixture is subjected to thermal decomposition at a temperature between about 140° C. and about 300° C. to yield a resulting product of 2,2'-dithienyl sulfide.

Having described in a general way the nature of this invention, the following specific examples are given by way of illustration:

EXAMPLE 1

*Preparation of 2,2'-dithienyl disulfide*

Four hundred twenty parts by weight of thiophene were placed in a reaction vessel and warmed to a temperature of 75° C. Sixty-seven and five-tenths parts by weight of sulfur monochloride were then added dropwise over a period of 1½ hours. The molar ratio of thiophene to sulfur monochloride in the reaction mixture was 10 to 1. Hydrogen chloride was evolved during the course of the reaction. The mixture was maintained at a temperature of about 75° C.

with agitation for 13 hours. The resulting reaction product was poured into water. The resulting organic layer was separated, water-washed twice, then washed with 1% by weight aqueous sodium carbonate solution, and finally with water until neutral. Unreacted thiophene was removed by distillation to yield a residual product of dithienyl disulfide amounting to 108 parts by weight.

*Preparation of 2,2'-dithienyl sulfide*

The dithienyl disulfide above obtained (108 parts by weight) was distilled under a reduced pressure of 5 millimeters of mercury. The pot temperature during distillation was 180–215° C. and the vapor temperature 80–132° C. Thirty-nine parts by weight of a light yellow oil, amounting to about 36% by weight of the charge, were obtained. The undistilled material decomposed to a black, coke-like residue with evolution of hydrogen sulfide. Redistillation of the light yellow oil under a reduced pressure of 8 millimeters of mercury yielded a product amounting to 20 parts by weight, boiling in the range of 130–135° C.

The redistilled product so obtained was characterized as 2,2'-dithienyl sulfide by its boiling point of 130–135° C. at 8 millimeters of mercury corresponding to a boiling point of 275–280° C. at 760 millimeters of mercury. This is in excellent agreement with the boiling point of 2,2'-dithienyl sulfide, reported in the literature, of 155° C. at 14.5 millimeters of mercury, equivalent to a boiling point of 280° C. at 760 millimeters of mercury. The product was further shown to be 2,2'-dithienyl sulfide by its sulfur content of 48.9%, the theoretical sulfur content being 48.4%. The sulfone of the product was further prepared by dissolving a sample thereof in glacial acetic acid and oxidizing with 30% by weight hydrogen peroxide. The compound obtained by this treatment had a melting point of 128.5–129.5° C. and a sulfur content of 41.1%. These figures are in excellent agreement with the melting point of 130–131° C. and a sulfur content of 41.7%, reported in the literature for the sulfone of 2,2'-dithienyl sulfide.

EXAMPLE 2

*Preparation of 2,2'-dithienyl disulfide*

Eight hundred forty parts by weight of thiophene were placed in a reaction vessel and heated to 75° C. One hundred thirty-five parts by weight of sulfur monochloride were then added dropwise over a period of 3 hours, while maintaining the reaction mixture between 75° C. and 82° C. The molar ratio of thiophene to sulfur monochloride in the reaction mixture was 10 to 1. Hydrogen chloride was evolved during the course of the reaction. The mixture was maintained within the above temperature range for 6 hours. The resulting reaction mixture was then cooled and poured into ice water. The organic layer was removed, water-washed, then washed with 1% by weight aqueous sodium carbonate solution, and finally washed with water until neutral. Unreacted thiophene was removed by distillation, yielding 189 parts by weight of a brownish oily liquid. A portion of this material (139 parts by weight) was taken up in benzene and extracted twice with a saturated portion of sodium bisulfite. The benzene layer was then extracted twice with 200 parts by weight of a 5% aqueous caustic solution and finally with water until neutral. Benzene was removed by distillation, yielding 110 parts by weight of 2,2'-dithienyl disulfide.

*Preparation of 2,2'-dithienyl sulfide*

Fifty parts of the dithienyl disulfide above obtained were distilled under reduced pressure conditions shown below:

| | Pressure (mm. Hg) | Pot Temp., °C. | Vapor Temp., °C. | Yield, Parts |
|---|---|---|---|---|
| (1) | 0.5 | 140–200 | 110–134 | 16 |
| (2) | 0.1 | 140–210 | 100–115 | 5 |

The total distillate so obtained amounted to 42% by weight of the charge material. This distillate product was characterized as 2,2'-dithienyl sulfide by the melting point of the sulfone prepared therefrom, as described in the preceding example. Furthermore, a mixed melting point of the present product with that obtained in Example 1 gave no depression.

It is apparent from the above examples that 2,2'-dithienyl sulfide may be obtained in commercially attractive yields by thermal decomposition of 2,2'-dithienyl sulfide which, in turn, is readily produced by the reaction of an excess of thiophene with sulfur monochloride. The product of 2,2'-dithienyl sulfide is thus obtained in accordance with the present process from readily available reagents without involving the intermediate preparation of a Grignard reagent such as has heretofore been deemed necessary.

The product of 2,2'-dithienyl sulfide produced in accordance with this invention is useful as a chemical intermediate in the synthesis of pharmaceuticals, plasticizers, odorants, addition compounds for petroleum fractions and resins, as well as a variety of other useful commercial products.

I claim:

1. A process for preparing 2,2'-dithienyl sulfide, which comprises distilling 2,2'-dithienyl disulfide at a temperature between about 140° C. and about 200° C. under a reduced pressure of less than about 100 millimeters of mercury and collecting the resulting distillate.

2. A process for preparing 2,2'-dithienyl sulfide, which comprises distilling 2,2'-dithienyl disulfide at a temperature between about 140° C. and about 200° C. and a pressure between about 0.1 and about 10 millimeters of mercury.

3. A process which comprises the addition of sulfur monochloride to excess thiophene present in such amount that the overall ratio of thiophene to sulfur monochloride is greater than 2, distilling the resulting product of 2,2'-dithienyl disulfide at a temperature between about 140° C. and about 200° C. under a reduced pressure of less than 100 millimeters of mercury and collecting the resulting distillate of 2,2'-dithienyl sulfide.

4. A process which comprises the addition of sulfur monochloride to thiophene at a temperature between about 20° C. and about 135° C., said thiophene being maintained in excess during the aforesaid addition and present in such amount that the overall ratio of thiophene to sulfur monochloride is greater than 5, distilling the resulting product of 2,2'-dithienyl disulfide at a temperature between about 140° C. and about 200° C. under a reduced pressure of less than 100 millimeters of mercury and collecting the resulting distillate of 2,2'-dithienyl sulfide.

5. A process which comprises the addition of sulfur monochloride to thiophene at a temperature between about 20° C. and about 135° C., said thiophene being maintained in excess during the aforesaid addition and present in such amount that the overall ratio of thiophene to sulfur monochloride is greater than 5, distilling the resulting product of 2,2'-dithienyl disulfide at a temperature between about 140° C. and about 200° C. and a pressure between about 0.1 and about 10 millimeters of mercury and collecting the resulting distillate of 2,2'-dithienyl sulfide.

6. A process for preparing 2,2'-dithienyl sulfide which comprises distilling 2,2'-dithienyl disulfide at a temperature between about 140° C. and about 200° C.

EMIL KOFT, Jr.

REFERENCES CITED

The following references are of record in the file of this patent:

UNITED STATES PATENTS

| Number | Name | Date |
|---|---|---|
| 2,504,903 | Sturgis | Apr. 18, 1950 |

OTHER REFERENCES

Beilstein Handbuch der Organische Chemie, vol. 6, pp. 323–324 (1923), 1st Supplement to vol. 6, p. 143 (1931).

Bernthsen and Sudborough, Organic Chemistry, p. 549, Van Nostrand, N. Y., 1925.